United States Patent
Kerzner et al.

(10) Patent No.: US 11,196,968 B1
(45) Date of Patent: Dec. 7, 2021

(54) SYSTEM FOR GENERATING DRONE VIDEO FEED OVERLAYS BASED ON PROPERTY MONITORING SYSTEM DATA

(71) Applicant: Alarm.com Incorporated, Tysons, VA (US)

(72) Inventors: Daniel Todd Kerzner, McLean, VA (US); Donald Madden, State College, PA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/535,971

(22) Filed: Aug. 8, 2019

Related U.S. Application Data

(60) Provisional application No. 62/716,318, filed on Aug. 8, 2018.

(51) Int. Cl.
| | |
|---|---|
| *H04N 7/18* | (2006.01) |
| *G06T 19/00* | (2011.01) |
| *G08B 13/196* | (2006.01) |
| *G06T 11/00* | (2006.01) |
| *G06K 9/00* | (2006.01) |
| *B64D 47/08* | (2006.01) |
| *G05D 1/00* | (2006.01) |
| *B64C 39/02* | (2006.01) |

(52) U.S. Cl.
CPC ............ *H04N 7/185* (2013.01); *B64C 39/024* (2013.01); *B64D 47/08* (2013.01); *G05D 1/0038* (2013.01); *G06K 9/0063* (2013.01); *G06K 9/00771* (2013.01); *G06T 11/00* (2013.01); *B64C 2201/027* (2013.01); *B64C 2201/127* (2013.01); *B64C 2201/146* (2013.01)

(58) Field of Classification Search
CPC . H04N 7/185; G06T 19/006; G08B 13/19645
See application file for complete search history.

(56) References Cited

U.S. PATENT DOCUMENTS

| | | | |
|---|---|---|---|
| 10,031,518 B1 | 7/2018 | Tofte et al. | |
| 2003/0085992 A1* | 5/2003 | Arpa | G08B 13/19608 348/47 |
| 2008/0170118 A1* | 7/2008 | Albertson | A61H 3/061 348/46 |
| 2011/0285851 A1* | 11/2011 | Plocher | H04N 7/18 348/152 |

(Continued)

Primary Examiner — Yi Yang
(74) Attorney, Agent, or Firm — Fish & Richardson P.C.

(57) ABSTRACT

A monitoring system that is configured to monitor a property is disclosed. The monitoring system includes a sensor that is configured to generate sensor data that reflects an attribute of a property. The monitoring system further includes a drone that generates image data, location data, and orientation data. The monitoring system further includes a monitor control unit. The monitor control unit is configured to receive the sensor data, the location data, and the orientation data. The monitor control unit is configured to determine that an event has occurred at the property and a location of the event within the property. The monitor control unit is configured to generate a graphical overlay based on the event, the location data, and the orientation data. The monitor control unit is configured to generate a graphical interface. The monitor control unit is configured to output the graphical interface.

14 Claims, 3 Drawing Sheets

(56) References Cited

U.S. PATENT DOCUMENTS

| | | | |
|---|---|---|---|
| 2016/0016663 A1* | 1/2016 | Stanek | G05D 1/0094 |
| | | | 701/3 |
| 2016/0266577 A1* | 9/2016 | Kerzner | G08B 15/002 |
| 2016/0267759 A1* | 9/2016 | Kerzner | G06T 19/006 |
| 2017/0092109 A1* | 3/2017 | Trundle | G05D 1/104 |
| 2017/0205827 A1* | 7/2017 | Rezvani | G05D 1/02 |
| 2017/0243400 A1* | 8/2017 | Skidmore | G06F 3/04842 |

* cited by examiner

200

```
RECEIVE, BY THE DRONE CONTROL SYSTEM AND FROM A
MONITORING SYSTEM, MONITORING SYSTEM INFORMATION
DESCRIBING ONE OR MORE SENSED ATTRIBUTES OF A PROPERTY
WHERE AN ALARM EVENT HAS BEEN DETECTED      210
```

↓

```
DETERMINE, BY THE DRONE CONTROL SYSTEM, LOCATION
INFORMATION RELATED TO AN ALARM EVENT THAT AS BEEN
AT THE PROPERTY                              220
```

↓

```
GENERATE, BY THE DRONE CONTROL SYSTEM, RENDERING DATA THAT,
WHEN PROCESSED BY THE DRONE CONTROL SYSTEM, GENERATES A
VISUAL OVERLAY COMPRISING ONE OR MORE GRAPHICAL NAVIGATIONAL
ELEMENTS ON TOP OF THE VIDEO FEED RECEIVED FROM A DRONE
                                             230
```

↓

```
GENERATE, BY THE DRONE CONTROL SYSTEM AND BASED ON
PROCESSING OF THE GENERATED RENDERING DATA, THE ONE OR
MORE GRAPHICAL NAVIGATIONAL ELEMENTS AS A VISUAL OVERLAY
ON TOP OF A RECEIVED DRONE CAMERA FEED       240
```

FIG. 2

SYSTEM FOR GENERATING DRONE VIDEO FEED OVERLAYS BASED ON PROPERTY MONITORING SYSTEM DATA

CROSS-REFERENCE TO RELATED APPLICATION

This application claims the benefit of U.S. Application 62/716,318, filed Aug. 8, 2018, the contents of which are incorporated by reference.

TECHNICAL FIELD

This disclosure generally relates to monitoring systems.

BACKGROUND

A central station often takes steps to verify whether a detected alarm event at property is an actual alarm or a false alarm. In conventional systems, a central station operator will communicate with a property occupant through a communication unit of a monitoring system control unit, or other form of control panel, to ask a property occupant whether the detected alarm event at the property is an actual alarm or a false alarm. Alternatively, or in addition, a central station operator may call a property occupant on a landline telephone or mobile cellular phone to ask the property occupant whether the detect alarm event at the property is an actual alarm event or a false alarm.

SUMMARY

According to an innovative aspect of the subject matter described in this application, a monitoring system is configured to monitor a property. The monitoring system includes a sensor that is configured to generate sensor data that reflects an attribute of a property; a drone (i) that includes a camera that is configured to generate image data and (ii) that is configured to generate location data that indicates a location of the drone and orientation data that indicates an orientation of the drone; and a monitor control unit. The monitor control unit is configured to receive the sensor data; receive the location data and the orientation data; based on the sensor data, determine that an event has occurred at the property and a location of the event within the property; generate a graphical overlay based on the event, the location data, and the orientation data; generate a graphical interface by combining the image data and the graphical overlay; and provide, for output, the graphical interface.

These and other implementations can each optionally include one or more of the following features. The monitor control unit is configured to determine that the image data does not include a representation of the location of the event; and determine a relative location between the location of the event and a portion of the property depicted in the image data; generate the graphical overlay by generating an arrow based on the relative location between the location of the event and the portion of the property depicted in the image data; and generate the graphical interface by adding the arrow to the image data such that the arrow points in a direction of the event. The monitor control unit is configured to determine that an event has occurred at the property and a location of the event within the property by determining a path that a person has traveled through the property; determine the image data includes a representation of the location of the path; generate the graphical overlay by generating a line based on the path; and generate the graphical interface by adding the line to the portion of the image data that includes the representation of the location of the path. The monitor control unit is configured to determine that the image data includes a representation of the location of the event; generate the graphical overlay by generating an location marker based on determining that the image data includes the representation of the location of the event; and generate the graphical interface by adding the location marker to the representation of the location of the event in the image data. The monitor control unit is configured to provide the graphical interface by providing the graphical interface to a drone control system that is configured to receive navigation instructions for the drone. The monitor control unit is configured to determine that the event has occurred at the property and the location of the event within the property by determining that an alarm event has occurred at the property; and generate the graphical overlay by generating the graphical overlay based on determining that the alarm event has occurred at the property. The monitor control unit is configured to receive, from the drone, additional location data that indicates that the drone is in a different location and additional orientation data that indicates a different orientation of the drone; based on the event, the additional location data, and the additional orientation data, generate an additional graphical overlay; generate an additional graphical interface by combining the image data and the additional graphical overlay; and provide, for output, the additional graphical interface. The monitor control unit is configured to generate the graphical interface by, based on the event, the location data, and the orientation data, determining a position on the image data to overlay the graphical overlay; and overlaying the graphical overlay on the image data at the determined position. The monitor control unit is configured to determine that an event has occurred at the property and a location of the event within the property by determining a path that a person is likely to travel through the property; determine the image data includes a representation of the location of the path that the person is likely to travel; generate the graphical overlay by generating a line based on the path that the person is likely to travel; and generate the graphical interface by adding the line to the portion of the image data that includes the representation of the location of the path that the person is likely to travel. The drone is a controlled by a human viewing the graphical interface.

Other implementations of this aspect include corresponding systems, apparatus, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description and the drawings.

BRIEF DESCRIPTION OF THE DRAWINGS

FIG. 2 is a flowchart of a process for generating drone video feed overlays based on property monitoring system data.

DETAILED DESCRIPTION

Figure 1:
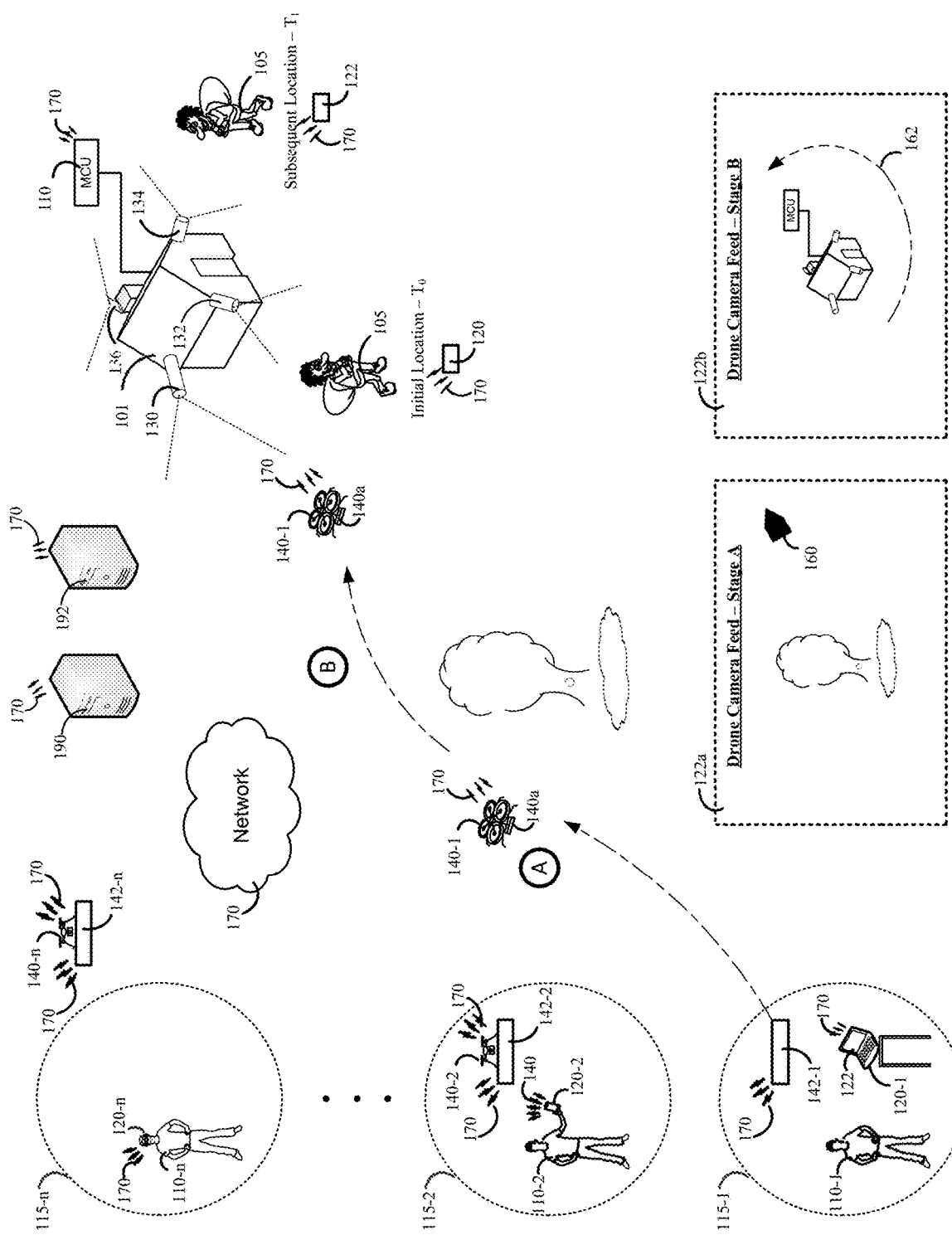
FIG. 1 is a contextual diagram of system for generating drone video feed overlays based on property monitoring system data.

FIG. 1 is a contextual diagram of monitoring system 100 for generating drone video feed overlays based on property monitoring system data. The monitoring system 100 may include a monitoring system control unit 110, one or more sensors 120, 122, one or more cameras 130, 132, 134, 136, one or more drones 140-1, 140-2, 140-n (wherein "n" is any positive integer greater than 0), one or more drone charging stations 142-1, 142-2, 142-n, one or more drone control systems such as a laptop 120-1, a smartphone 120-2, or a virtual reality headset 120-n (wherein "n" is any positive integer greater than 0), one or more networks 170, a monitoring application server 190, a central alarm station server 192, or any combination thereof.

A monitoring system control unit 110 (or monitoring application server 190) may monitor sensor data, camera data, or both, that are generated by monitoring system components such as sensors 120, 122, cameras 130, 132, 134, 136, or a combination thereof. The monitoring system control unit 110 (or monitoring application server 190) may be able to determine, based on the sensor data, camera data, or both, whether to trigger an alarm indicating that an alarm event has been detected at the property 101.

For example, a monitoring system control unit 110 (or monitoring application server 190) may obtain camera data (e.g., image, video, or the like) that includes one or more images (i) captured by a camera 130, 132, 134, or 136 installed at the property 101 and (ii) depicting a human object such as a trespasser 105 at the property 101. The monitoring system control unit 110 (or monitoring application server 190) may compare the captured image of the human object to stored images of persons authorized to access the property 101. In some implementations, the monitoring system 100 may determine whether to trigger an alarm based on the comparison of captured images to stored images of persons authorized to access the property 101.

For example, responsive to determining that a captured image depicts a human object that is not authorized to access the property 101, while the monitoring system 100 is armed, the monitoring system control unit 110 (or monitoring application server 190) may trigger an alarm event. The monitoring system 100 may determine that a captured image depicts a human object that is not authorized to access the property 110 if the depicted human object does not match any stored images of persons authorized to access the property 101.

Alternatively, for example, if it is determined that a captured image depicts a human object that is authorized to access the property 101, while the monitoring system 100 is armed, then the monitoring system control unit 110 (or monitoring application server 190) may determine to not trigger an alarm event. The monitoring system 100 may determine that a captured image depicts a human object that is authorized to access the property 110 if the depicted human object does match one or more stored images of persons authorized to access the property 101.

However, the monitoring system 100 is also capable of triggering an alarm based on an analysis of one or more images in other ways than performing a comparison of a captured image to a stored set of one or more images. Instead, the monitoring system 100 may use one or more image models to determine whether a captured image depicts an object, whose detection, should trigger an alarm event.

By way of example, a component of the monitoring system 100 such as the monitoring system control unit 110, the monitoring application server 190, or a camera such as camera 130, 132, 134, or 136 may store an image model. The image model may include a model that represents an object or an image of the object. For example, the image model may include a set of image features identifying an object that are extracted from an image of the object, a neural network that has been trained to determine whether a received image depicts a particular object, or the like. The component of the monitoring system 100 storing the image model may then obtain one or more images, and then determine, using the image model, whether one or more obtained images are within a predetermined level of similarity to the image represented by the image model.

In some implementations, the stored image model may represent an object that, once detected, should trigger an alarm event. For example, the stored image model may depict a person who has a warrant out for his or her arrest. Accordingly, if the monitoring system component determines that a captured image matches the stored image model within a predetermined level of similarity, then the monitoring system component may trigger an alarm event. In these instances, detection of an object that is not sufficiently similar to the stored image model may not trigger an alarm event.

In other implementations, a monitoring system component may store multiple image models that each represent object that, once detected, should not trigger the occurrence of an alarm event. For example, the monitoring system component may store an image model representing each lawful occupant of the property. Accordingly, in such instances, a monitoring system component may not trigger an alarm upon determining that an obtained image falls within a predetermined level of similarity to the stored image model, even if the monitoring system is armed. Moreover, in such implementations, the monitoring system may be configured to trigger an alarm event when an image of an object that does not match the stored image model of authorized users.

The monitoring system 100 may be fully customizable such that a user can input alarm triggering criteria for each stored image model that indicates the image model, a type of image model (e.g., depicting an object that is authorized, depicting an object that is unauthorized), whether detection of an image depicting an object represented by the model should trigger an alarm, whether detection of an image depicting an object not represented by one or more stored image models should trigger an alarm, any combination thereof, or the like. The stored image models may be uploaded by a property occupant using a user device. Alternatively, the stored image models may be downloaded to the monitoring system components from a remote source such as another, different component of the monitoring system 100.

In other instances, the monitoring system 100 may trigger an alarm based on sensor data. For example, a monitoring system control unit 110 (or monitoring application server 190) can monitor sensor data generated by one or more sensors such as motion sensors 120, 122 to determine whether to trigger an alarm event. The sensors monitored by one or more components of the monitoring system 100 may be inside, or outside, the property 101. In some implementations, the monitoring system control unit 110 (or monitoring application server 190), when the monitoring system 100 is armed, can trigger an alarm based on a detection of sensor data generated by a motion sensor that is indicative of motion within a predetermined distance of the motion sensor. Similarly, the monitoring system control unit 110 (or monitoring application server 190) can trigger alarms based on the detection of other types of sensor data, if the one or more other types of sensor data are generated by other sensors when the monitoring system 100 is armed. For example, the monitoring system control unit 110 (or monitoring application server 190) can trigger an alarm in response to detection of sensor data generated by a contact sensor indicating that a door or window has opened, sensor data generated by a glass break sensor indicating that glass has been broken, sensor data generated by a smoke detector indicating that smoke has been detected, or the like when the monitoring system 100 is armed.

For purposes of this disclosure, a monitoring system 100, one or more of its monitoring system components including a monitoring system control unit 110, monitoring application server 190, or both, may be considered armed if the monitoring system is configured to trigger an alarm responsive to one or more attributes detected by the monitoring system that are indicative of an event (e.g., an image captured by a camera depicting a non-authorized person, motion detected by a motion sensor, opening of a door or window detected by a contact sensor, breaking of glass detected by a glass break sensor, or the like). In some implementations, the monitoring system 100, or one or more of its monitoring system components, may become armed responsive to a user request to arm the monitoring system 100, or one or more of its monitoring system components.

Responsive to the triggering of an alarm based on a detected alarm event, the system 100 may perform one or more operations to verify whether an actual alarm event is occurring at the property 101. For example, a central station operator can try to communicate with a property occupant using the monitoring system control unit 110, a landline telephone, mobile telephone, or the like in an attempt to verify whether an actual alarm event is occurring at the property 101. Alternatively, or in addition, a central station operator may try to capture camera data from one or more cameras 130, 132, 134, 136 installed at the property 101 and analyze the captured camera data to verify whether an actual alarm event is occurring at the property 101. In yet other implementations, one or more components of the monitoring system 100 may use a fleet of drones 140-1, 140-2, 140-$n$ (where "n" is any positive integer) to verify an alarm event.

Each drone 140-1, 140-2, 140-$n$ of the fleet of one or more drones 140-1, 140-2, 140-$n$ may each piloted by a human pilot 110-1, 110-2, 110-$n$. In some implementations, each drone 140-1, 140-2 may be housed at the same location 115-1, 115-2 as the pilot 110-1, 110-2 for the drone. In some implementations, the same location may include a drone location that is within a predetermined distance of the human pilot. In some implementations, the same location may include a drone location that is within view (e.g., a line of sight) of the human pilot.

In other implementations, the drone 140-$n$ may be housed at a location that is remote from the location 115-$n$ of the human pilot 110$n$ that is to pilot the drone 140-$n$. In some implementations, being remote from the location of the human pilot may include the drone being located more than a predetermined distance from the human pilot. In some implementations, being remote from the location of the human pilot may include the drone be located outside of the view (e.g., outside of the human pilot's line of sight). In some implementations, the drone 140$n$ that is housed remotely from the pilot 110-$n$ may be a drone housed at the property 101 and belonging to the property 101 owner, resident, occupant, or the like. In some implementations, the drone 140$n$ may be a drone that is housed in a drone hub of multiple different drones available for multiple different purposes. For example, a drone of the drone hub may be permanently boarded at the drone hub or a drone of the drone hub may be rented, as necessary, by a human pilot 110$n$. By way of example, a drone of a drone hub may be used at a first time to deliver a package as part of a delivery service. However, in such an example, the same drone may be used by a pilot 110-$n$ at a second time to visually verify an alarm event.

Responsive to the triggering of an alarm at a property 101, a message such as an alarm event notification may be transmitted by a component of the monitoring system 100 such as the monitoring system control unit 110 (or monitoring application server 190) to the central alarm station server 192 (or other component of the monitoring system 100). The central alarm station server 192 (or other component of the monitoring system 100) may (i) receive the message notifying the central alarm station server 192 (or other component of the monitoring system 100) of the occurrence of an alarm event at the property, and then (ii) select a particular human pilot of the multiple different human pilots 110-1, 110-2, 110-$n$ to pilot a drone to a property that triggered the alarm to verify the occurrence of an alarm event at the property.

Selection of a particular human pilot from the group of human pilots 110-1, 110-2, 110-$n$ may be based on a variety of factors including (i) the human pilot's position in a queue of available human pilots able to assist with remotely piloting a drone to verify an alarm event, (ii) the location of the human pilot 110-1, 110-2, 110-$n$ relative to the property 101 where the alarm event was triggered, (iii) the location of respective drone 140-1, 140-2, 140-$n$ piloted by the human pilot 110-1, 110-2, 110-$n$ relative to the property, (iv) the current availability (e.g., pilot status) of the human pilot 110-1, 110-2, 110-$n$ to pilot a drone 140-1, 140-2, 140-$n$ to the property 101, (v) the capabilities of the drone 140-1, 140-2, 140-$n$ that is under the command of the human pilot 110-1, 110-2, 110-$n$, (vi) the capabilities of the pilot 110-1, 110-2, 110-$n$ that is to pilot the drone 140-1, 140-2, 140-$n$ (vii) the feedback rating associated with the human pilot 110-1, 110-2, 110-$n$ based on past flights, (viii) the compensation requirements of the human pilot 110-1, 110-2, 110-$n$, or any combination thereof.

Subsequent to being selected by the central alarm station server 192 (or other component of the monitoring system 100), the selected human pilot can instruct a particular drone of the multiple drones to deploy. The selected human pilot can then pilot the deployed drone to the property 101 that triggered the alarm using one or more drone control systems 120-1, 120-2, 120-$n$. Each drone control system 120-1, 120-2, 120-$n$ may also include a display such as display 122 that enables a human pilot such as pilot 110-1 view the video feed generated by one or more drone cameras 140$a$.

Each drone control system 120-1, 120-2, 120-$n$ (or each drone 140-1, 140-2, 140-$n$) can be configured to communicate with one or more monitoring system components installed at the property 101 using the network 170. For example, the one or more drone control systems 120-1, 120-2, 120-$n$ (or the drone 140-1, 140-2, 140-$n$) can be configured to receive monitoring system information from the monitoring system control unit 110, monitoring application server 190, monitoring system sensors 120, 122 installed at the property 101, monitoring system cameras 130, 132, 134, 136 installed at the property 101, or any combination thereof via the network 170. The monitoring system information may include sensor data generated by one or more sensors 120, 122 installed at the property 101, image data captured by one or more cameras 130, 132, 134, 136 installed at the property 101, sensor configuration data, camera configuration data, or a combination thereof. Configuration data may include, for example, information describing the location (e.g., GPS location, address, or the like) of the sensor or camera, position of sensor or camera within a property (e.g., living room, kitchen, front yard, back yard, right-back corner of house, height of a camera, or the like), the orientation a camera (e.g., angled downwards 45 degrees, angled downwards towards backyard at 45 degrees, or the like), or any combination thereof. Accordingly, by way of one example, the camera configuration may include, for example, the height the camera is mounted at, the angle the camera is mounted at, a GPS location where the camera is located, or a combination thereof.

However, camera configuration data, and use thereof, need not be so limited. Specifically, there are other types of configuration data the monitoring system may use and other ways the monitoring system can determine, or represent, a camera's position and orientation. For example, using a three-dimensional map of the property where the camera is located, the monitoring system can estimate one or more of a camera's intrinsic parameters such as focal length, sensor size, distortion parameters, or the like in order to determine the projection of the camera into space. Alternatively, or in addition, homography can be used to represent the transformation between the camera's image plane and the ground plane.

The one or more drone control systems 120-1, 120-2, 120-n (or the drone 140-1, 140-2, 140-n) may use the monitoring system information received from the monitoring system control unit 110, monitoring application server 190, the one or more sensors 120, 122, the one or more cameras 130, 132, 134, 136, or a combination thereof, to generate rendering data that, when rendered by the one or more drone control systems 120-1, 120-2, 120-n (or the drone 140-1, 140-2, 140-n), can be used to generate a drone feed overlay. The drone feed overlay can help a human pilot to pilot a drone to quickly navigate the drone to one or more particular locations in order to verify an alarm event. In those implementations where the monitoring system information is received, and processed by, the drone 140-1, 140-2, 140-n to generate the rendering data for the drone feed overlay, the drone 140-1, 140-2, 140-n may stream (i) the video feed from the drone camera 140a and (ii) the rendering data for the drone feed overlay back to the respective drone control system 120-1, 120-2, 120-n that is being used to pilot the drone 140-1, 140-2, 140-n. In other implementations, one or more monitoring system components such as the monitoring application server 190, monitoring system control unit 110, or other component of the monitoring system 100 may generate rendering data based on monitoring system information and providing the generated rendering data to a drone control system 120-1, 120-2, or 120-n for use in generating a drone feed overlay on top of a drone video feed.

With reference to the example of FIG. 1, a monitoring system 100 may detect sensor data, camera data, or both that is indicative of an event, and trigger an alarm. For example, the monitoring system 100 may detect sensor data, camera data, or both that are indicative of the presence of a trespasser 105. Responsive to a determination that an alarm has been triggered at the property 101, a component of the monitoring system 100 such as the monitoring system control unit 110, the monitoring application server 190, or the central alarm station server 192 select a drone pilot such as drone pilot 110-1 to deploy and pilot a drone 140-1 to the property 101 in order to visually verify the detected alarm event. The pilot 110-1 may be selected based on a variety of factors including (i) the human pilot's position in a queue of available human pilots able to assist with remotely piloting a drone to verify an alarm event, (ii) the location of the human pilot 110-1, 110-2, 110-n relative to the property 101 where the alarm event was triggered, (iii) the location of respective drone 140-1, 140-2, 140-n piloted by the human pilot 110-1, 110-2, 110-n relative to the property, (iv) the current availability (e.g., pilot status) of the human pilot 110-1, 110-2, 110-n to pilot a drone 140-1, 140-2, 140-n to the property 101, (v) the capabilities of the drone 140-1, 140-2, 140-n that is under the command of the human pilot 110-1, 110-2, 110-n, (vi) the capabilities of the pilot 110-1, 110-2, 110-n that is to pilot the drone 140-1, 140-2, 140-n (vii) the feedback rating associated with the human pilot 110-1, 110-2, 110-n based on past flights, (viii) the compensation requirements of the human pilot 110-1, 110-2, 110-n, or any combination thereof.

The pilot 110-1 can then use the drone control system 110-1 to deploy the drone 140-1. The drone control system 120-1 can be used to pilot the drone 140-1 remotely. The pilot 110-1 can monitor a video feed received from one or more drone 140-1 cameras 140a using the display 122 of the drone control system 120-1. In some implementations, the drone pilot 110-1 may navigate the drone using conventional aviation techniques such as a GPS guidance system, enroute charts, inertial reference system data, radio navigation signals, a compass, or the like. Alternatively, or in addition, the drone pilot 110-1 may navigate the drone 140-1 using graphical elements rendered on the display 122 of the drone control system 120-1 based on monitoring system information. The graphical elements may be overlayed on top of a drone video feed in order to provide navigational guidance to the drone pilot 110-1 when the drone pilot 110-1 is navigating the drone 140-1. The drone video feed and monitoring system information used to generate the graphical elements using the network 170. The network 170 may include a WAN, a LAN, a cellular network, the Internet, or a combination thereof.

By way of example, after drone 140-1 deployment at stage A, the interface 122a may be output on the display 122 of the drone control system 120-1. The interface 122a is an example of a type of visual overlay that may be generated on top of a drone camera feed streamed to the display 122 at stage A from the drone camera 140a. For example, at stage A, the drone 140-1 is in flight between the drone's 140-2 charging station 142-1 and the property 101 and the drone's 140-1 camera 140a is captured images of a tree and a lake. Concurrently, one or more components of the monitoring system 100 are broadcasting monitoring system information related to the alarm event detected at the property 101 as a result of the detection of motion by a trespasser 105. The monitoring system information may be broadcast across the network 170. The drone control system 120-1 can receive (i) the monitoring system information indicative of detected motion at the property 101, monitoring system information indicating an alarm event is detected at property 101, or both and (ii) the streamed video feed from the drone 140-1. The drone control system 120-1 can determine a location of the alarm event based on the received monitoring system information and generate rendering data that, when processed by the drone control system 120-1 generates a graphical elements 160 that can be overlayed on top of the drone 140-1 camera's 140a video feed indicating the direction of the detected alarm event. In this example, the graphical element 160 may include an arrow displayed on top of the video feed of the tree and lake that shows the drone pilot 110-1 a direction that the drone pilot 110-1 needs to fly to reach the location associated with the alarm event at property 101. In some implementations, the graphical element 160 may be accompanied by a direction (e.g., S, SW, W, SE, E, NE, N, NW), a distance to target (e.g., 15 miles), or other navigational information that may be helpful to the drone pilot 110-1.

The monitoring system 100 can continue to monitor sensor data, camera data, or both, generated by monitoring system 100 components installed at the property 101 after an alarm event has been detected at the property 101. For example, at stage B, the monitoring system 100 can capture camera data generated by the camera 132 at a first time T0 that depicts a trespasser 105 at an initial location. The monitoring system 100 can provide first monitoring system information to the drone control system 120-1 that describes the initial location of the trespasser 105 at time T0. Then, the monitoring system can capture camera data generated by a camera 134 at a second time T1 that depicts the trespasser 105 at a subsequent location. The monitoring system 100 can then provide second monitoring system information to the drone control system 120-1 that describes the subsequent location of the trespasser 105 at time T1. The drone control system 120-1 can then process the first monitoring system information and the second monitoring system information to generate rendering data that, when processed by the drone control system 120-1, outputs an interface 122b on the display 122 of the drone control system 120-1 that includes the graphical element 162 overlayed on top of the drone 140-1 camera's 140a video feed. In this example at stage B, the graphical element 162 may include a navigation path that the detected trespasser 105 is following.

In some implementations, the navigation path shown by graphical element 162 may include an actual path followed by the trespasser 105 as detected by monitoring system information received by the drone control system 120-1. Alternatively, in some implementations, the navigation path shown by graphical element 162 may be based on an actual path followed by the trespasser 105, a projected path that the trespasser 105 is likely to follow, or a combination thereof. A projected path may be based, at least in part, on projected trajectory that the trespasser 105 is likely navigating in view of the path the trespasser 105 has previously traveled.

Alternatively, or in addition, the drone control system 120-1 may also generate, based on received monitoring system information, rendering data that, when processed by the drone control system 120-1, results in the highlighting of one or more relevant objects in a drone video feed. For example, the drone control system 120-1 can generate rendering that, when process by the drone control system 120-1, highlights a house that is located at an address where the alarm event was detected, a detected trespasser, a detected emergency event (e.g., a fire, a leak, a power outage, or the like), one or more pre-defined obstacles, or the like.

In some implementations, the drone control system 120-1, 120-2, or 120-n may access three dimensional information, such as an elevation model, of the property. The drone control system 120-1, 120-2, or 120-n may access the three dimensional information from an online source or the monitor control unit of each property may provide the three dimensional information to the drone control system 120-1, 120-2, or 120-n. In some instances, the monitor control unit may generate the three dimensional information during calibration of the camera of the drone or another camera on the property or during a site survey. The drone control system 120-1, 120-2, or 120-n may use the three dimensional information to improve accuracy when determining where to overlay the graphical element 160 or the graphical element 162. The drone control system 120-1, 120-2, or 120-n may compare the three dimensional information to the image to identify an appropriate location for the graphical element 160 or the graphical element 162.

FIG. 2 is a flowchart of a process 200 for generating drone video feed overlays based on property monitoring system data. Generally, the process 200 may include receiving, by a drone control system and from a monitoring system, monitoring system information describing one or more sensed attributes of a property where an alarm event has been detected (210), determining, by the drone control system, location information related to an alarm event that has been detected at the property (220), generating, by the drone control system, rendering data that, when processed by the drone control system, generates a visual overlay comprising one or more graphical navigational elements on top of the video feed received from a drone (230), generating, by the drone control system and based on processing the generated rendering data, the one or more graphical navigational elements as a visual overlay on top of the video feed received from the drone (240).

Figure 3:
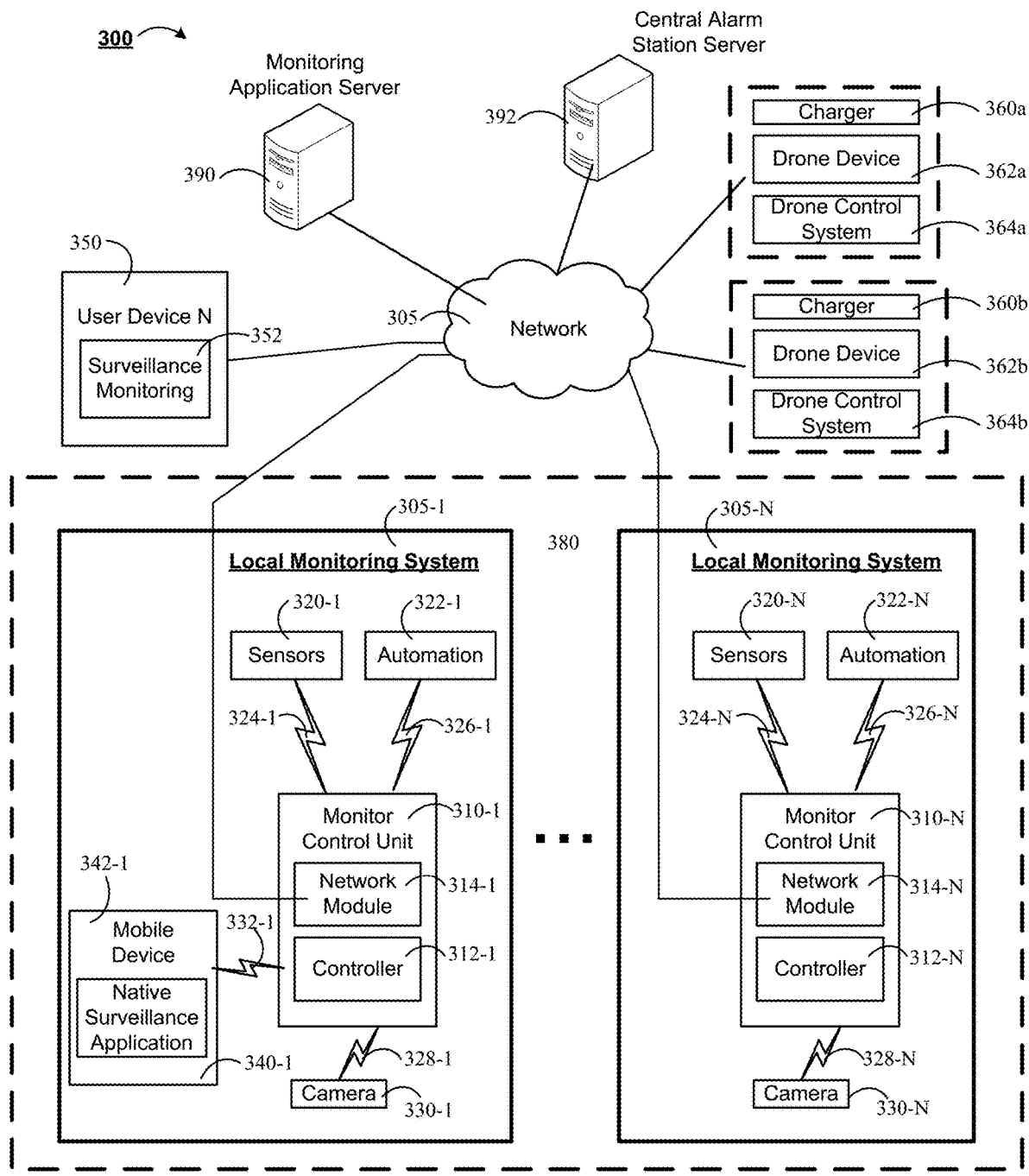
FIG. 3 is a block diagram of system components that can be used to implement a system for generating drone video feed overlays based on property monitoring system data.

FIG. 3 is a block diagram of system components that can be used to implement a system for generating drone video feed overlays based on property monitoring system data.

The electronic system 300 includes a network 305, a monitor control unit 310-1, one or more user devices 340-1, 350, monitoring application server 390, and a central alarm station server 392.

The network 305 is configured to enable exchange of electronic communications between devices connected to the network 305. For example, the network 305 may be configured to enable exchange of electronic communications between the monitoring system control unit 310-1, the one or more user devices 340-1, 350, the monitoring application server 390, and the central alarm station server 392. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The monitoring system control unit 310-1 includes a controller 312-1 and a network module 314-1. The controller 312-1 is configured to control a monitoring system (e.g., a home alarm or security system) that includes the monitoring system control unit 310-1. In some implementations, the controller 312-1 may include a processor or other control circuitry configured to execute instructions of a program that controls operation of an alarm system. In these examples, the controller 312-1 may be configured to receive input from sensors, detectors, or other devices included in the alarm system and control operations of devices included in the alarm system or other household devices (e.g., a thermostat, an appliance, lights, etc.). For example, the controller 312-1 may be configured to control operation of the network module 314-1 included in the monitoring system control unit 310-1.

The network module 314-1 is a communication device configured to exchange communications over the network 305. The network module 314-1 may be a wireless communication module configured to exchange wireless communications over the network 305. For example, the network module 314-1 may be a wireless communication device configured to exchange communications over a wireless data channel and a wireless voice channel. In this example, the network module 314-1 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314-1 also may be a wired communication module configured to exchange communications over the network 305 using a wired connection. For instance, the network module 314-1 may be a modem, a network interface card, or another type of network interface device. The network module 314-1 may be an Ethernet network card configured to enable the monitoring system control unit 310-1 to communicate over a local area network and/or the Internet. The network module 314-1 also may be a voiceband modem configured to enable the alarm panel to communicate over the telephone lines of Plain Old Telephone Systems (POTS).

The monitoring system that includes the monitoring system control unit 310-1 includes one or more sensors or detectors. For example, the monitoring system may include multiple sensors 320-1. The sensors 320-1 may include a contact sensor, a motion sensor, a glass break sensor, or any other type of sensor included in an alarm system or security system. The sensors 320-1 also may include an environmental sensor, such as a temperature sensor, a water sensor, a rain sensor, a wind sensor, a light sensor, a smoke detector, a carbon monoxide detector, an air quality sensor, etc. The sensors 320-1 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some implementations, the sensors 320-1 may include a radio-frequency identification (RFID) sensor that identifies a particular article that includes a pre-assigned RFID tag.

The monitoring system control unit 310-1 communicates with the module 322-1 and the camera 330-1 to perform surveillance or monitoring. The module 322-1 is connected to one or more devices that enable home automation control. For instance, the module 322-1 may be connected to one or more lighting systems and may be configured to control operation of the one or more lighting systems. Also, the module 322-1 may be connected to one or more electronic locks at the property and may be configured to control operation of the one or more electronic locks (e.g., control Z-Wave locks using wireless communications in the Z-Wave protocol). Further, the module 322-1 may be connected to one or more appliances at the property and may be configured to control operation of the one or more appliances. The module 322-1 may include multiple modules that are each specific to the type of device being controlled in an automated manner. The module 322-1 may control the one or more devices based on commands received from the monitoring system control unit 310-1. For instance, the module 322-1 may cause a lighting system to illuminate an area to provide a better image of the area when captured by a camera 330-1.

The camera 330-1 may be a video/photographic camera or other type of optical sensing device configured to capture images. For instance, the camera 330-1 may be configured to capture images of an area within a building monitored by the monitoring system control unit 310-1. The camera 330-1 may be configured to capture single, static images of the area and also video images of the area in which multiple images of the area are captured at a relatively high frequency (e.g., thirty images per second). The camera 330-1 may be controlled based on commands received from the monitoring system control unit 310-1.

The camera 330-1 may be triggered by several different types of techniques. For instance, a Passive Infra Red (PIR) motion sensor may be built into the camera 330-1 and used to trigger the camera 330-1 to capture one or more images when motion is detected. The camera 330-1 also may include a microwave motion sensor built into the camera and used to trigger the camera 330-1 to capture one or more images when motion is detected. The camera 330-1 may have a "normally open" or "normally closed" digital input that can trigger capture of one or more images when external sensors (e.g., the sensors 320-1, PIR, door/window, etc.) detect motion or other events. In some implementations, the camera 330-1 receives a command to capture an image when external devices detect motion or another potential alarm event. The camera 330-1 may receive the command from the controller 312-1 or directly from one of the sensors 320-1.

In some implementations, the camera 330-1 triggers integrated or external illuminators (e.g., Infra Red, Z-wave controlled "white" lights, lights controlled by the module 322-1, etc.) to improve image quality when the scene is dark. An integrated or separate light sensor may be used to determine if illumination is desired and may result in increased image quality.

The camera 330-1 may be programmed with any combination of time/day schedules, system "arming state", or other variables to determine whether images should be captured or not when triggers occur. The camera 330-1 may enter a low-power mode when not capturing images. In this case, the camera 330-1 may wake periodically to check for inbound messages from the controller 312-1. The camera 330-1 may be powered by internal, replaceable batteries if located remotely from the monitoring control unit 310-1. The camera 330-1 may employ a small solar cell to recharge the battery when light is available. Alternatively, the camera 330-1 may be powered by the controller's 312-1 power supply if the camera 330-1 is co-located with the controller 312-1.

In some implementations, the camera 330-1 communicates directly with the monitoring application server 390 over the Internet. In these implementations, image data captured by the camera 330-1 does not pass through the monitoring system control unit 310-1 and the camera 330-1 receives commands related to operation from the monitoring application server 390.

The sensors 320-1, the module 322-1, and the camera 330-1 communicate with the controller 312-1 over communication links 324, 326-1, and 328-1. The communication links 324, 326-1, and 328-1 may be a wired or wireless data pathways configured to transmit signals from the sensors 320-1, the module 322-1, and the camera 330-1 to the controller 312-1. The sensors 320-1, the module 322-1, and the camera 330-1 may continuously transmit sensed values to the controller 312-1, periodically transmit sensed values to the controller 312-1, or transmit sensed values to the controller 312-1 in response to a change in a sensed value.

The communication links 324, 326-1, and 328-1 may include a local network. The sensors 320-1, the module 322-1, the camera 330-1, and the controller 312-1 may exchange data and commands over the local network. The local network may include 802.11 "Wi-Fi" wireless Ethernet (e.g., using low-power Wi-Fi 33 chipsets), Z-Wave, ZigBee, Bluetooth, "Homeplug" or other "Powerline" networks that operate over AC wiring, and a Category 3 (CATS) or Category 3 (CAT6) wired Ethernet network. The local network may be a mesh network constructed based on the devices connected to the mesh network.

The central alarm station server 392 is an electronic device configured to provide alarm monitoring service by exchanging communications with the monitoring system control unit 310-1, the one or more mobile devices 340-1, 350, the monitoring application server 390, and the central alarm station server 392 over the network 305. For example, the central alarm station server 392 may be configured to monitor alarm events generated by the monitoring system control unit 310-1. In this example, the central alarm station server 392 may exchange communications with the network module 314-1 included in the monitoring system control unit 310-1 to receive information regarding alarm events detected by the monitoring system control unit 310-1. The central alarm station server 392 also may receive information regarding alarm events from the one or more mobile devices 340-1, 350, and/or the monitoring application server 390.

The central alarm station server 392 is connected to multiple terminals. The terminals may be used by operators to process alarm events. For example, the central alarm station server 392 may route alarm data to the terminals to enable an operator to process the alarm data. The terminals may include general-purpose computers (e.g., desktop personal computers, workstations, or laptop computers) that are configured to receive alarm data from a server in the central alarm station server 392 and render a display of information based on the alarm data. For instance, the controller 312-1 may control the network module 314-1 to transmit, to the central alarm station server 392, alarm data indicating that a sensor 320 detected a door opening when the monitoring system 300 was armed. The central alarm station server 392 may receive the alarm data and route the alarm data to a particular terminal of the one or more terminals for processing by an operator associated with the particular terminal. The particular terminal may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the monitoring application server 390 may route alarm data received from the network module 314-1 or the one or more user devices 340-1, 350 to the central alarm station server 392. For example, the monitoring application server 390 may transmit the alarm data to the central alarm station server 392 over the network 305.

The monitoring application server 390 may store sensor and image data received from the monitoring system and perform analysis of sensor and image data received from the monitoring system. Based on the analysis, the monitoring application server 390 may communicate with and control aspects of the monitoring system control unit 310-1 or the one or more user devices 340-1, 350.

The system 300 may also include one or more drone devices 362a, 362b. The drone devices 362a, 362b may include any robotic device that can be deployed to visually verify an alarm event at a property. The drone device 362a, 362b may include a drone that travels on land, a drone that travels in the air, a drone that travels across water, a drone that travels underneath water, or a combination thereof. The drone device 362a, 362b may be configured to communicate with any of the components depicted in FIG. 3 using the network 305. In some implementations, the drone device 362a may be capable of autonomous flight. Alternatively, the drone device 362a, 362b may be remotely piloted by a drone pilot using the drone control system 364a, 364n. For example, a drone pilot may input navigational commands using the drone control system 364a, 364b that cause the drone device 362a, 362b to respond. For example, the drone control systems 364a, 364b may include an input device such as a yoke that can be used navigate the drone device 362a, 362b.

The drone control system 364a, 364b may communicate any of the components described in system 300 using the network 305. The drone control systems 362a, 362b can obtain monitoring system information from one or more local monitoring systems 305-1 to 305-N. For example, in some implementations, the drone control systems 362a, 362b may obtain monitoring system information from a single local monitoring system 305-1. Alternatively, or in addition, the drone control systems 362a, 362b may obtain monitoring information from different local monitoring systems 305-1, 305-N that is received and analyzed independently. Alternatively, or in addition, the drone control systems 362a, 362b may obtain monitoring information from different local monitoring systems 305-1, 305-N that is analyzed together as part of a collaborative network 380 of local monitoring system 305-1, 305-N. Such an implementations may be beneficial for use in generated a graphical element representing a path of a trespasser as an overlay of a drone video feed as the trespasser travels from property to property. In some implementations, the trespasser may travel from property to property to evade capture by law enforcement, avoid detection by the drone devices 362a, 362b, or the like.

Each drone device 362a, 362b may be associated with a drone charger 360a, 360b. For example, the drone device 362a, 362b may use the drone chargers 360a, 360b to recharge a drone device battery. The chargers 360a, 360b may include a charging station that may require that one or more portions of the drone device 362a, 362b make physical contact with the cameras 360a, 360b. Alternatively, the drone charger 360a, 360b may include one or more wireless chargers. For example, the drone chargers 360a, 360b may begin wireless charging of the drone chargers 360a, 360 battery based on determining that the drone device 362a, 3624 is within a predetermined distance of the drone charging station 360a, 360b.

In some implementations, the monitoring application server 390 may activate a collaborative network 380 that enables the monitoring application server 390 to obtain monitoring system data such as image data, sensor data or both from multiple different monitoring systems 310-1 to 310-N that are part of respective local monitoring systems 305-1 to 305-N. The monitoring application server 390 may activate a collaborative network between multiple properties if, for example, users from each of the multiple properties have opted into an object tracking service. The local monitoring systems 305-1 to 305-N may be installed at different respective properties. Once activated, the collaborative network 380 enables to the monitoring application server 390 or central alarm station server 392 to analyze feeds from cameras 330-1 to 330-N as if the cameras 330-1 to 330-N were part of the same local monitoring network. For example, In response to determining that a break-in occurred at a property where location monitoring system 305-1 is installed, the monitoring application server 390 may be being obtaining monitoring system data such as sensor data, image data, or both, generated by sensors 320-N and cameras 330-N.

The monitoring application server 390 is connected to multiple terminals. The terminals may be used by operators to process alarm events. For example, the monitoring application server 390 may route alarm data to the terminals to enable an operator to process the alarm data. The terminals may include general-purpose computers (e.g., desktop personal computers, workstations, or laptop computers) that are configured to receive alarm data from a server in the monitoring application server 390 and render a display of information based on the alarm data. For instance, the controller 312-1 may control the network module 314-1 to transmit, to the monitoring application server 390, alarm data indicating that a sensor 320-1 detected a door opening when the monitoring system was armed. The monitoring application server 390 may receive the alarm data and route the alarm data to the terminal for processing by an operator associated with the terminal. The terminal may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals may be mobile devices or devices designed for a specific function. Although FIG. 3 illustrates two terminals for brevity, actual implementations may include more (and, perhaps, many more) terminals.

In some implementations, the monitoring application server 390 may exchange communications with an emergency service provider to transmit alarm signal data indicating an alarm event taking place within a property where the monitor control unit 310-1 may be located. For instance, the monitoring application server 390 may transmit incident reports in response to the monitor control unit 310-1 detecting an alarm event where a user requires emergency assistance. In such instances, the monitoring application server 390 may be an electronic device that communicates essential safety information to an emergency responder such as an emergency medical responder, a fire department, or a public safety access point.

In some implementations, the monitoring application server 390 may be a third party entity separate from the central alarm station server 392. For example, the monitoring application server 390 may be a central alarm station for a security service provider, a campus security server in a school or school/university police department, or security gateway for a particular residential neighborhood. For instance, the monitoring application server 390 may be registered to the system 300 using a connection bridge such as the application (e.g., the native surveillance application 342-1), using a unique user identifier such as a username and password or a Quick Response (QR). In other instances, the monitoring application server 390 may be registered to users within a particular geographic location (e.g., a gated residential community) where users within the geographical location are registered to a particular monitoring application server 390, a particular central alarm station server 392 of the particular location, or the like.

The one or more user devices 340-1, 350 are devices that host and display user interfaces. For instance, the user device 340-1 is a mobile device that hosts one or more native applications (e.g., the native surveillance application 342-1). The user device 340-1 may be a cellular phone or a non-cellular locally networked device with a display. The user device 340-1 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340-1 may perform functions unrelated to the monitoring system, such as placing personal telephone calls, playing music, playing video, displaying pictures, browsing the Internet, maintaining an electronic calendar, etc.

The user device 340-1 includes a native surveillance application 342-1. The native surveillance application 342-1 refers to a software/firmware program running on the corresponding mobile device that enables the user interface and features described throughout. The user device 340-1 may load or install the native surveillance application 342-1 based on data received over a network or data received from local media. The native surveillance application 342-1 runs on mobile devices platforms, such as iPhone, iPod touch, Blackberry, Google Android, Windows Mobile, etc. The native surveillance application 342-1 enables the user device 340-1 to receive and process image and sensor data from the monitoring system.

The user device 350 may be a general-purpose computer (e.g., a desktop personal computer, a workstation, or a laptop computer) that is configured to communicate with the monitoring application server 390 and/or the monitoring system control unit 310-1 over the network 305. The user device 350 may be configured to display a surveillance monitoring user interface 352 that is generated by the user device 350 or generated by the monitoring application server 390. For example, the user device 350 may be configured to display a user interface (e.g., a web page) provided by the monitoring application server 390 that enables a user to perceive images captured by the camera 330-1 and/or reports related to the monitoring system. Although FIG. 3 illustrates two user devices for brevity, actual implementations may include more (and, perhaps, many more) or fewer user devices.

In some implementations, the one or more user devices 340-1, 350 communicate with and receive monitoring system data from the monitoring system control unit 310-1 using the communication link 338. For instance, the one or more user devices 340-1, 350 may communicate with the monitoring system control unit 310-1 using various local wireless protocols such as Wi-Fi, Bluetooth, Z-Wave, Zig-Bee, HomePlug (Ethernet over powerline), or wired protocols such as Ethernet and USB, to connect the one or more user devices 340-1, 350 to local security and automation equipment. The one or more user devices 340-1, 350 may connect locally to the monitoring system and its sensors and other devices. The local connection may improve the speed of status and control communications because communicating through the network 105 with a remote server (e.g., the monitoring application server 390) may be significantly slower.

Although the one or more user devices 340-1, 350 are shown as communicating with the monitoring system control unit 310-1, the one or more user devices 340-1, 350 may communicate directly with the sensors and other devices controlled by the monitoring system control unit 310-1. In some implementations, the one or more user devices 340-1, 350 replace the monitoring system control unit 310-1 and perform the functions of the monitoring system control unit 310-1 for local monitoring and long range/offsite communication.

In other implementations, the one or more user devices 340-1, 350 receive monitoring system data captured by the monitoring system control unit 310-1 through the network 305. The one or more user devices 340-1, 350 may receive the data from the monitoring system control unit 310-1 through the network 305 or the monitoring application server 390 may relay data received from the monitoring system control unit 310-1 to the one or more user devices 340-1, 350 through the network 305. In this regard, the monitoring application server 390 may facilitate communication between the one or more user devices 340-1, 350 and the monitoring system.

In some implementations, the one or more user devices 340-1, 350 may be configured to switch whether the one or more user devices 340-1, 350 communicate with the monitoring system control unit 310-1 directly (e.g., through link 338) or through the monitoring application server 390 (e.g., through network 305) based on a location of the one or more user devices 340-1, 350. For instance, when the one or more user devices 340-1, 350 are located close to the monitoring system control unit 310-1 and in range to communicate directly with the monitoring system control unit 310-1, the one or more user devices 340-1, 350 use direct communication. When the one or more user devices 340-1, 350 are located far from the monitoring system control unit 310-1 and not in range to communicate directly with the monitoring system control unit 310-1, the one or more user devices 340-1, 350 use communication through the monitoring application server 390.

Although the one or more user devices 340-1, 350 are shown as being connected to the network 105, in some implementations, the one or more user devices 340-1, 350 are not connected to the network 305. In these implementations, the one or more user devices 340-1, 350 communicate directly with one or more of the monitoring system components and no network (e.g., Internet) connection or reliance on remote servers is needed.

In some implementations, the one or more user devices 340-1, 350 are used in conjunction with only local sensors and/or local devices in a house. In these implementations, the system 300 only includes the one or more user devices 340-1, 350, the sensors 320-1, the module 322-1, and the camera 330-1. The one or more user devices 340-1, 350 receive data directly from the sensors 320-1, the module 322-1, and the camera 330-1 and sends data directly to the sensors 320-1, the module 322-1, and the camera 330-1. The one or more user devices 340-1, 350 provide the appropriate interfaces/processing to provide visual surveillance and reporting.

In other implementations, the system 300 further includes network 305 and the sensors 320-1, the module 322-1, and the camera 330-1 are configured to communicate sensor and image data to the one or more user devices 340-1, 350 over network 305 (e.g., the Internet, cellular network, etc.). In yet another implementation, the sensors 320-1, the module 322-1, and the camera 330-1 (or a component, such as a bridge/router) are intelligent enough to change the communication pathway from a direct local pathway when the one or more user devices 340-1, 350 are in close physical proximity to the sensors 320-1, the module 322-1, and the camera 330-1 to a pathway over network 305 when the one or more user devices 340-1, 350 are farther from the sensors 320-1, the module 322-1, and the camera 330-1. In some implementations, the system leverages GPS information from the one or more user devices 340-1, 350 to determine whether the one or more user devices 340-1, 350 are close enough to the sensors 320-1, the module 322-1, and the camera 330-1 to use the direct local pathway or whether the one or more user devices 340-1, 350 are far enough from the sensors 320-1, the module 322-1, and the camera 330-1 that the pathway over network 305 is required. In other examples, the system leverages status communications (e.g., pinging) between the one or more user devices 340-1, 350 and the sensors 320-1, the module 322-1, and the camera 330-1 to determine whether communication using the direct local pathway is possible. If communication using the direct local pathway is possible, the one or more user devices 340-1, 350 communicate with the sensors 320-1, the module 322-1, and the camera 330-1 using the direct local pathway. If communication using the direct local pathway is not possible, the one or more user devices 340-1, 350 communicate with the sensors 320-1, the module 322-1, and the camera 330-1 using the pathway over network 305.

In some implementations, the system 300 provides end users with access to images captured by the camera 330-1 to aid in decision making. The system 300 may transmit the images captured by the camera 330-1 over a wireless WAN network to the user devices 340-1, 350. Because transmission over a wireless WAN network may be relatively expensive, the system 300 uses several techniques to reduce costs while providing access to significant levels of useful visual information.

In some implementations, a state of the monitoring system and other events sensed by the monitoring system may be used to enable/disable video/image recording devices (e.g., the camera 330-1). In these implementations, the camera 330-1 may be set to capture images on a periodic basis when the alarm system is armed in an "Away" state, but set not to capture images when the alarm system is armed in a "Stay" state or disarmed. In addition, the camera 330-1 may be triggered to begin capturing images when the alarm system detects an event, such as an alarm event, a door opening event for a door that leads to an area within a field of view of the camera 330-1, or motion in the area within the field of view of the camera 330-1. In other implementations, the camera 130 may capture images continuously, but the captured images may be stored or transmitted over a network when needed.

In some implementations, the drone devices 370 and 372 may analyze the images captured during the scan of a property for the presence of persons in the captured images. For instance, the drone devices 370 and 372 may use image processing techniques in an attempt to identify shapes in the captured images that resemble a human body. The drone devices 370 and 372 also may analyze the images for moving objects (or use other techniques to identify moving objects) and target imaging on capture of moving objects.

What is claimed is:

1. A monitoring system that is configured to monitor a property, the monitoring system comprising:
   a set of sensors configured to generate sensor data reflecting one or more attributes of a property, wherein the sensor data comprises at least a first camera and a second camera;
   a drone configured to capture one or more images; and
   a monitor control unit configured to:
      based on the sensor data, detect a location of an alarm event at the property and an intruder nearby the property;
      receive, at a first time, an image collected by the first camera and including a representation of the intruder;
      based on the image collected by the first camera, determine a first location of the intruder;
      receive, at a second time, an image collected by the second camera and including the representation of the intruder;
      based on the image collected by the second camera, determine a second location of the intruder;
      based on the first location and the second location, determine a projected path of the intruder;
      provide, to the drone, an instruction to (i) navigate along the projected path and (ii) collect a video feed while navigating along the projected path;
      generate a first graphical element for the projected path;
      generate a second graphical element for the alarm event, wherein the second graphical element comprises one or more navigational indicators based on a present location of the drone and the location of the alarm event;
      generate a graphical interface by overlaying the first graphical element and the second graphical element on the video feed, wherein the graphical interface is configured to adjust the one or more navigational indicators based on changes to the present location of the drone in relation to the location of the alarm event as the drone navigates along the projected path; and
      provide, for output, the graphical interface.

2. The monitoring system of claim 1, wherein the monitor control unit is configured to:
   generate the first graphical element by generating a line based on the projected path; and
   generate the graphical interface by adding the line to a portion of the video feed that includes the projected path.

3. The monitoring system of claim 1, wherein the monitor control unit is configured to:
   determine that the video feed includes the representation of the intruder;
   generate the first graphical element by generating a location marker based on determining that the video feed includes the representation of the intruder; and
   generate the graphical interface by adding the location marker to the representation of the intruder in the video feed.

4. The monitoring system of claim 1, wherein the monitor control unit is configured to:
   provide the graphical interface by providing the graphical interface to a drone control system that is configured to receive navigation instructions for the drone.

5. The monitoring system of claim 1, wherein the monitor control unit is configured to:
   generate the first graphical element by generating the first graphical element based on detecting the intruder nearby the property.

6. The monitoring system of claim 1, wherein the monitor control unit is configured to generate the graphical interface by:
   determining a position on the video feed to overlay the first graphical element; and
   overlaying the first graphical element on the video feed at the position.

7. The monitoring system of claim 1, wherein the drone is controlled by a human viewing the graphical interface.

8. A computer-implemented method comprising:
   receiving, from a set of sensors and by a monitoring system configured to monitor a property, sensor data reflecting one or more attributes of the property, wherein the sensor data comprises at least a first camera and a second camera;
   based on the sensor data, detecting, by the monitoring system, a location of an alarm event at the property and an intruder nearby the property;
   receiving, at a first time and by the monitoring system, an image collected by the first camera and including a representation of the intruder;
   based on the image collected by the first camera, determining, by the monitoring system, a first location of the intruder;
   receiving, at a second time and by the monitoring system, an image collected by the second camera and including the representation of the intruder;
   based on the image collected by the second camera, determining, by the monitoring system, a second location of the intruder;
   based on the first location and the second location, determining, by the monitoring system, a projected path of the intruder;
   providing, to a drone and by the monitoring system, an instruction to (i) navigate along the projected path and (ii) collect a video feed while navigating along the projected path;
   receiving, from the drone and by the monitoring system, data indicating the video feed while the drone is navigating along the projected path;
   generating, by the monitoring system, a first graphical element for the projected path;
   generating, by the monitoring system, a second graphical element for the alarm event, wherein the second graphical element comprises one or more navigational indicators based on a present location of the drone and the location of the alarm event;
   generating, by the monitoring system, a graphical interface by overlaying the first graphical element and the second graphical element on the video feed, wherein the graphical interface is configured to adjust the one or more navigational indicators based on changes to the present location of the drone in relation to the location of the alarm event as the drone navigates along the projected path; and providing, for output by the monitoring system, the graphical interface.

9. The method of claim 8, comprising:

generating the first graphical element by generating a line based on the projected path; and generating the graphical interface by adding the line to a portion of the video feed that includes the projected path.

10. The method of claim 8, comprising:

determining, by the monitoring system, that the video feed includes the representation of the intruder;

generating the first graphical element by generating, by the monitoring system, an location marker based on determining that the video feed includes the representation of the intruder; and generating the graphical interface by adding, by the monitoring system, the location marker to the representation of the intruder in the video feed.

11. The method of claim 8, comprising:

providing the graphical interface by providing the graphical interface to a drone control system that is configured to receive navigation instructions for the drone.

12. The method of claim 8, comprising:

generating the first graphical element by generating the first graphical element based on detecting the intruder nearby the property.

13. The method of claim 8, wherein generating the graphical interface comprises:

determining, by the monitoring system, a position on the video feed to overlay the first graphical element; and overlaying, by the monitoring system, the first graphical element on the video feed at the position.

14. The method of claim 8, wherein the drone is controlled by a human viewing the graphical interface.

* * * * *